Patented July 1, 1930

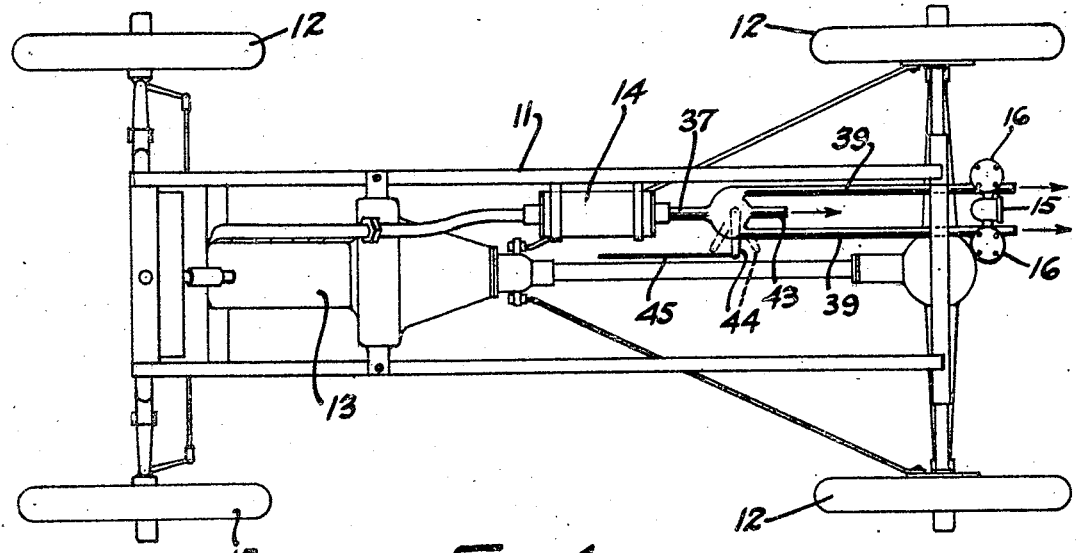
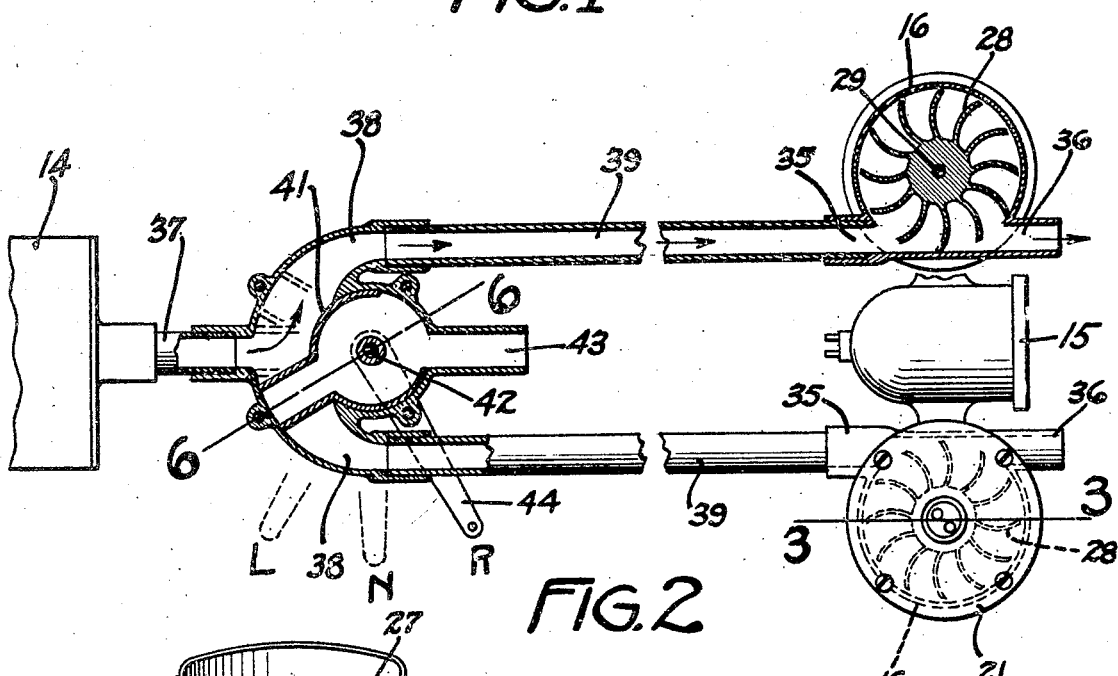
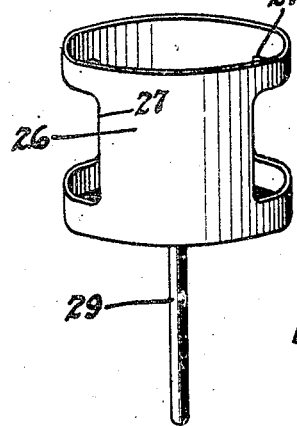

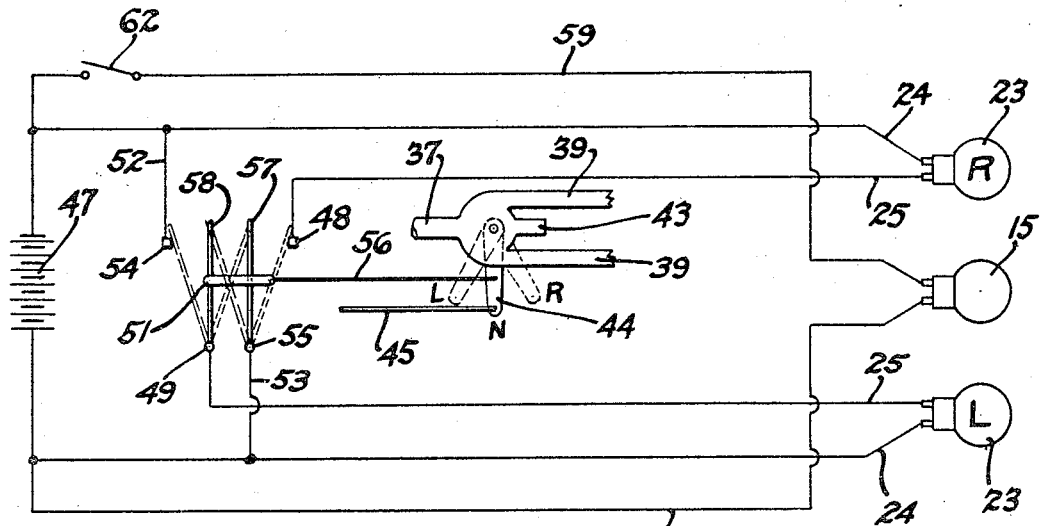
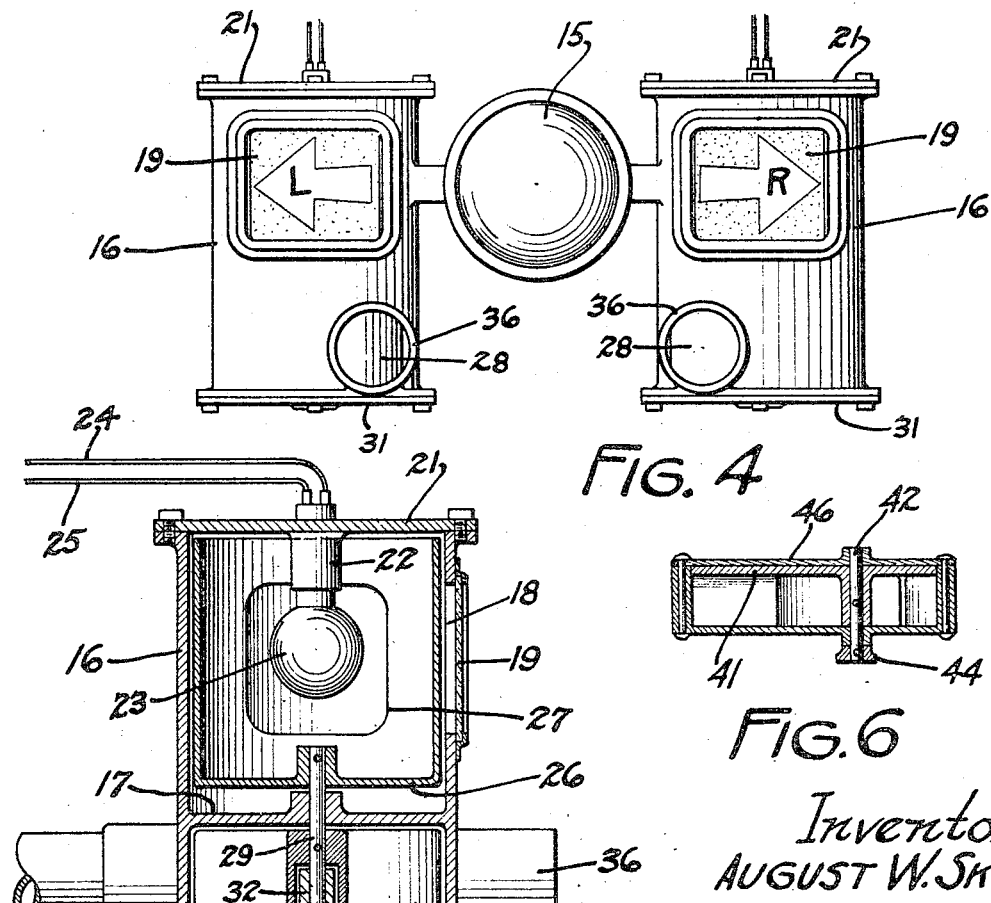

1,768,717

UNITED STATES PATENT OFFICE

AUGUST W. SKOG, OF MINNEAPOLIS, MINNESOTA

VEHICLE TURNING SIGNAL

Application filed June 19, 1925. Serial No. 38,259.

This invention relates to new and useful improvements in vehicle turning signals and more particularly relates to such a device adapted to be used on automobiles and which is adapted to be actuated by the exhaust gases from the engine.

An object of the invention is to provide a vehicle turning signal comprising two lamps having means therein for intermittently interrupting the emission of light therefrom when actuated, thereby causing the light to flash or be obscured or to alternately appear as if being turned on and off in rapid succession, thereby attracting the attention of persons following the vehicle.

A further object of the invention is to provide such a device having means for selectively directing the flow of gases from the exhaust pipe to the lamp indicating the direction it is desired to turn the vehicle.

A further object is to provide such a device preferably having the illuminating means or lights therein connected to the usual electric supply source of the vehicle by a circuit having a switch mechanism interposed therein, which switch may be operatively connected to the means for controlling the flow of exhaust gases to the lamps, and so arranged that when the gases are directed through one of the signal lamps, the light therein will simultaneously be turned on and when the flow of gases through such lamp is interrupted the light source will automatically be turned off.

A further and more specific object of the invention is to provide a turning signal comprising a lamp having a turbine wheel mounted in the lower portion thereof adapted to be actuated by the passage of exhaust gases therethrough, thereby rotating a cup-like member which will cause the light to appear as if flickering, thereby attracting the attention of persons following the vehicle.

A further object of the invention is to provide such a device of simple and inexpensive construction which may readily be applied to vehicles employing internal combustion engines as a motive power.

The particular object of the invention, therefore, is to provide an improved turning signal.

Other objects of the invention will appear from the following description and accompanying drawing and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification,

Figure 1 is a plan view of an automobile chassis showing the improved turning signal mounted thereon;

Figure 2 is an enlarged detail sectional view showing the means provided for selectively directing the exhaust gases to either of the signal lamps or to the atmosphere;

Figure 3 is a vertical sectional view on the line 3—3 of Figure 2 showing the general construction of one of the signal lamps;

Figure 4 is a rear view of the lamps showing the usual tail lamp mounted therebetween;

Figure 5 is a perspective view of the cup-like member rotatably mounted within each lamp to cause the light to appear as if alternately being turned on and off when the exhaust gases are directed through the lamps;

Figure 6 is a detail sectional view on the line 6—6 of Figure 2 showing the construction of the gas control valve; and Figure 7 is a wiring diagram showing how the signal lamps may be connected to the electric power source of the vehicle and adapted to be automatically turned on and off when the gas control valve is operated.

In the selected embodiment of the invention here shown, for purposes of disclosure, there is illustrated an automobile chassis comprising the usual frame 11, wheels 12 and engine 13, having a pipe connection to the usual muffler 14.

A feature of this invention resides in the novel construction in the turning signal lamps mounted at the rear end of the automobile and also in the novel means provided for operating such lamps. As shown in Figures 1, 2 and 4, there are preferably two such lamps provided, one for indicating a right hand turn and the other, a left hand turn. If desired, the usual tail lamp 15 may be mounted between the turning lamps as shown particularly in Figure 4, such lamp, however, having an independent circuit so that it may be turned on or off independently of the turning lamps.

Each turning lamp preferably comprises a casing 16 having an intermediate wall 17 arranged therein so that two chambers are provided in the lamp. The rear face of the casing 16 is provided with an opening 18 which is covered with a suitable closure such as a glass 19, which may be of any suitable color or, if desired, the lens or glass of each lamp may be of a different color and may be provided with a character such as the arrow head, shown in Figure 4, to indicate the turning direction of the vehicle. The upper end of the casing 16 is provided with a closure 21 having a socket 22 therein to receive the usual electric light bulb 23 having conductors 24 and 25 leading therefrom to a suitable source of electrical energy.

Another feature of the invention consists of the novel means provided for causing the electric light bulb 23 to appear as if being alternately turned on and off in rapid succession, thereby more readily attracting the attention of persons following the vehicle. To cause the light to thus flicker when functioning, a cup-shaped member 26, having one or more openings 27 provided in the walls thereof, is rotatably mounted within the upper chamber of the casing 16 so as to encircle the light bulb 23. The openings 27 are so arranged as to be substantially in horizontal alinement with the opening 18, and therefore the glass 19 in the casing, so that when one of the openings in the member 26 is in registration with the opening 18, the light rays will emanate through the glass 19. Conversely, when the openings 27 are moved out of alinement with the opening 18 in the casing, as shown in Figure 3, the opening 18 will be covered by the wall of the member 26, thereby preventing the light rays from emanating from the casing. It will, therefore, be seen that when the cup-shaped member 26 is rapidly rotated within the casing, the openings 27 and the solid portion of the wall thereof, will alternately pass over the opening 18, thereby causing a flickering action of the light rays caused by the opening 18 being alternately covered and uncovered as above described.

The means provided for rotating the cup-shaped member 26 preferably consists in mounting a small turbine wheel 28 upon the shaft 29 upon the upper end of which the member 26 is secured. A cap 31, having a hub 32 formed thereon to provide a bearing for the shaft 29, is secured to the lower face of the casing 16, thereby providing a relatively smaller chamber in which the turbine 28 is mounted. A steel ball 33 is preferably provided in the bottom of the socket 34 supporting the lower end of the shaft, this ball functioning to carry the weight of the turbine wheel 28 and the cup-shaped member 26 so that they may freely rotate when the exhaust gases are directed through a portion of the chamber. Intake and outlet openings 35 and 36 are provided in the lower chamber of the casing, as shown in the upper portion of Figure 2, so that when the exhaust gases are directed through the chamber they will impinge against the blades of the turbine, thereby causing it to rotate with a resultant rotation of the cup-shaped member 26 which in turn will cause the lamp to flicker when the light bulb 23 is turned on.

The means provided for selectively directing the exhaust gases from the muffler 14 to the selected turning lamp preferably consists in the provision of a valve mechanism interposed in the exhaust pipe between the lamps and the engine. As shown in Figure 2, the muffler 14 is connected to a three-way valve by means of a pipe connection 37. This valve comprises the opposed passages 38, each being connected to its respective turning lamp by means of a pipe connection 39 as shown. The gate or valve 41 is secured to a pin 42 which is pivotally mounted in the valve casing, as particularly shown in Figure 6. This valve or gate functions to direct the flow of gases from the muffler 14 to the selected turning lamp or when in neutral position, to the atmosphere, through an exhaust pipe 43. A lever 44 is secured to the shaft 42 to provide means for oscillating the valve 41. This lever preferably has a connection 45 leading therefrom to a suitable control lever or other operating mechanism mounted within the car for the convenient manipulation of the driver.

When the valve 41 is positioned as shown in full lines in Figure 2, the exhaust gases from the engine will pass through the valve and into the pipe section 39 shown in the upper portion of Figure 2, thence through the lower chamber of the right hand turning lamp, thereby causing the turbine 28 to be rotated with the resultant rotation of the cup-shaped member 26.

When the lever 44 is moved to the neutral position, indicated by the letter N in Figure 2, the exhaust gases will pass directly through the valve 41 and be discharged to the atmosphere through the exhaust pipe 43. When shifted to the L position in Figure 2, the gases will be directed through the lower pipe section 39 to the left hand turning lamp, thereby causing it to be actuated in a similar manner. The casing of the three-way valve is preferably provided with a removable closure 46 on one side to provide access to the interior of the valve. (See Figure 6.)

Figure 7 is a wiring diagram illustrating how the switch mechanism, controlling the flow of current through the lamp circuits, may be connected to the operating lever 44 of the three-way valve so that when the latter is operated, the circuit of the selected turning lamp will automatically be opened and closed depending upon the position of the lever 44, thereby automatically causing the turning lamps to be turned on and off each time the control lever 44 is operated.

As shown in the wiring diagram, the conductor 24 of each turning lamp leads from the lamp to one side of a battery 47, while the conductors 25 connect the lamps to terminals 48 and 49 of the control switch 51 as shown. The conductors 24 are also connected by wires 52 and 53, to terminals 54 and 55 of the switch 51. The switch 51 may be operatively connected to the control lever 44 by means of a connection 56 so that when the lever 44 is operated, the switch 51 will simultaneously be actuated to open and close the selected lamp circuit.

In operating this novel turning signal, the control lever 44 will be shifted from the neutral position, shown in full lines in Figure 1, to either the L or R position depending upon the direction in which it is desired to turn the vehicle. When the lever is shifted to the R position as shown in full lines in Figure 2, the switch contact 57 will be moved into electrical connection with the terminal 48 of the switch, thereby closing a circuit as follows:—From the terminal 48 through the conductor 25, right hand turning lamp, conductor 24 to one side of the battery 47, thence through a portion of the conductor 24 to the lead 53 and back to the complementary terminal 55 of the switch. When the control lever is shifted to the L or left hand position, the opposed switch contact 58 will be moved into electrical connection with the terminal 54, thereby closing a circuit which is as follows:—From the terminal 54 through the lead 52, through a portion of the conductor 24 to the battery; from the other side of the battery through the conductor 24 to the left hand turning lamp; thence through the conductor 25 to the terminal 49 of the switch, thereby causing the left hand turning lamp to be electrically turned on. When the control lever 44 is in neutral position, as shown in full lines in Figure 7, the switch contacts 57 and 58 will be out of electrical contact with the terminals 48 and 54, thereby causing both turning lamp circuits to be open with the result that the lamps will be dark.

In Figure 7, I have also shown the tail lamp circuit which consists of the conductors 59 and 61 leading from the lamp to the battery 47. A switch 62 is provided in the circuit to control the flow of current therethrough.

By the employment of the novel vehicle turning signal featured in this invention, it will readily be seen that each time it is desired to turn the vehicle and one of the turning lamps is turned on to indicate the direction of turning, such lamp will be caused to flicker, thereby readily attracting the attention of the driver of a following vehicle, which sometimes is not observed when using lamps of ordinary construction. It will also be noted that the flickering action of the lamp is affected by the utilization of the exhaust gases from the engine which may be selectively directed through either of the turning lamps, or when the control valve lever 44 is in neutral position, such gases will be exhausted to the atmosphere without having any effect on the turning lamps.

In the accompanying drawings, I have shown the three-way valve connected to one end of the usual muffler 14 but it is to be understood that the connection between the valve and the exhaust pipe or manifold of the engine may be varied or its location changed from that shown without departing from the invention.

I claim as my invention:

1. In combination with an automobile including an exhaust pipe, a chamber connected with the exhaust pipe and having three passages leading to the atmosphere, two of the passages being in pipes extending to the rear of the automobile, and each pipe having a lamp thereon, means associated with each lamp for obtaining a flickering effect including means operable by waste gas passing through the corresponding pipe, and a valve for alternately separately controlling flow through the lamp supporting pipes, said valve having a passage registrable with the third passage to exhaust to the atmosphere.

2. A unit for the purpose described comprising a casing adapted to be secured to the exhaust line of an automobile in communication with said line, and having three passages leading there-out-of, tubes communicating with two of the passages and adapted to extend to the rear of an automobile when the device is attached, a casing connected with each tube, each casing having a wheel chamber and an additional chamber, a lamp in said last mentioned chamber, and means in said last mentioned chamber associated with the lamp for obtaining flicker effects, a wheel in the first mentioned chamber operable by gases passing through the tube, means operatively connecting the wheel and flicker effecting means, and a valve for alternately controlling flow through the tubes, said valve having a passage registrable with the third passage to obtain exhaust to the atmosphere and being so arranged that when in this position exhaust to the other pipes is interrupted.

3. In combination with an automobile including an exhaust pipe, a casing connected with the pipe and having three passages leading there-out-of, tubes connected to and communicating with two of the passages and extending to the rear of the automobile, a pair of casings each having a tubular element in communication with one of the tubes, each casing having a wheel chamber and an additional chamber, a lamp in the additional chamber, means within the light chamber associated with each light for obtaining a flicker effect, a wheel in the first mentioned chamber rotatably operable by gases passing through the tube and connected for operating the flicker-effect means, a valve for alternately flow through the tubes, and electrical connections for the lamps including a switch and connection between the switch and the nately controlling flow through the tubes, and electrical connections for the lamps including a switch and connections between the switch and the valve for moving the switch to supply power for that lamp the flicker means of which is receiving power from the exhaust, and interrupt the power for both lamps when the valve is arranged to exhaust to the atmosphere.

4. A coupling for the purpose described comprising two casings, each having a passage, said passage extending in the same direction for coupling purposes, a partition for each casing dividing it into chambers, a wheel arranged in one chamber to be rotated by gases traveling through the passage and having a shaft extending through the partition into the other chamber, a lamp in the last mentioned chamber, means within this last mentioned chamber supported by the shaft and adapted to pass between the lamp and the side of the chamber, said chamber having a window through which the light can shine.

5. A unit for the purpose set forth comprising a casing having a tube extension adapted to be secured to the exhaust line of an automobile in communication with said line, and having three exhaust conduits, two of a length to extend to the rear of the automobile when the unit is attached, a valve arranged to separately and alternately control flow through each conduit, a device supported by the two extended conduits and including two casings each having a passage as a continuation of respective extended conduits and establishing communication between said conduits and the atmosphere, each casing having a wheel arranged to be rotated by exhaust gases rushing outwardly through the passages, and each having therein a lamp, and each having means associated with the lamp for obtaining a flickering effect, said means connected to be operated by the wheel, the wall of each casing having a window through which the light can shine, said window being arranged to face in a direction substantially rearwardly of the automobile when the device is attached.

In witness whereof, I have hereunto set my hand this 17th day of June, 1925.

AUGUST W. SKOG.